G. T. POLLARD.
ROTARY DRILLING MACHINERY.
APPLICATION FILED OCT. 3, 1921.
1,426,670.
Patented Aug. 22, 1922.
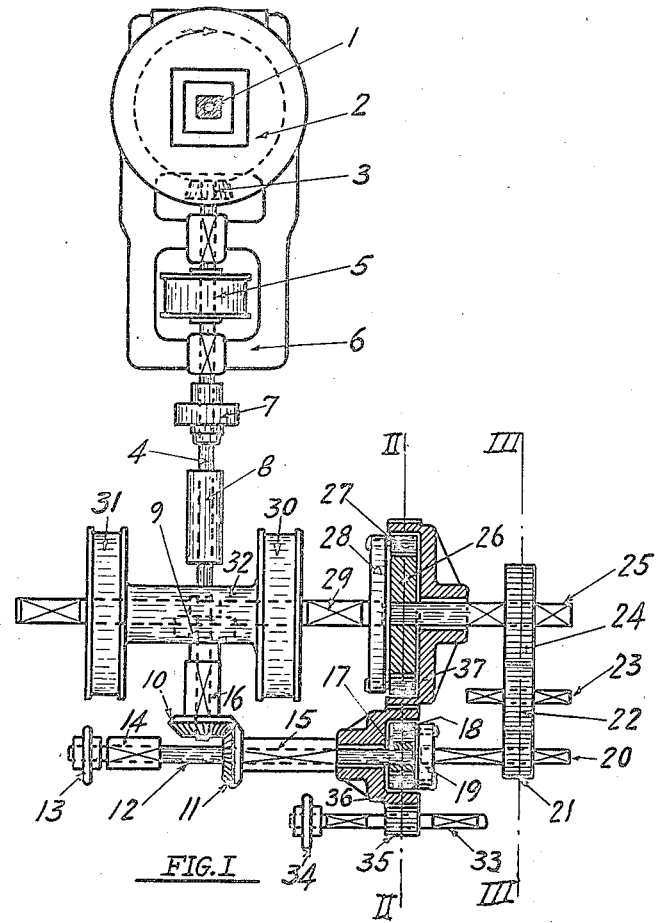
FIG. I
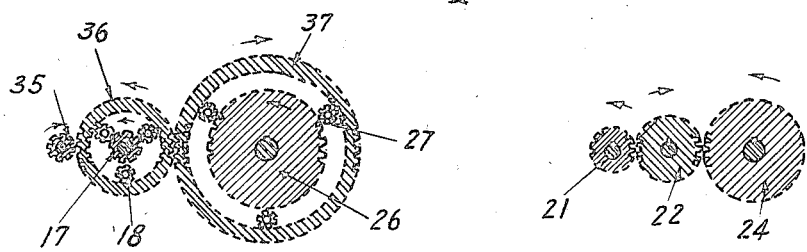
FIG. II
FIG. III
*Gurdon T. Pollard.*
INVENTOR.

UNITED STATES PATENT OFFICE.

GURDON T. POLLARD, OF DENVER, COLORADO.

ROTARY DRILLING MACHINERY.

1,426,670.   Specification of Letters Patent.   Patented Aug. 22, 1922.

Application filed October 3, 1921. Serial No. 505,131.

*To all whom it may concern:*

Be it known that I, GURDON T. POLLARD, a citizen of the United States, residing at Denver, county of Denver, State of Colorado, have invented certain new and useful Improvements in Rotary Drilling Machinery, of which the following is the specification.

The first object of my invention is to provide a construction to control the operation of a rotary drilling set, such as used in oil well drilling, which will accomplish automatically many functions that now require the close attention of an expert driller.

A further object is to provide a drilling set in which, a single source of power is transmitted through two planetary gear sets, so arranged to give a double differential action and automatically lift the drilling tool from the engaged surface by the action of the excessive resistance to the turning of the drilling tool.

A further object is to provide means, whereby, the rotating speed of drilling is regulated automatically to suit the many conditions met with while drilling an oil well.

A further object is to provide a safe guard, against all excessive tortional strains and twists offs, by providing a brake slippage in the system and a differential action to also safeguard the parts.

A further object is to provide a drilling set in which the gear parts may be easily changed, so that a fixed speed rate of drilling may be obtained to help out the automatic features.

A further object is to provide a drilling set, in which desirable hoisting speeds may be instantly obtained so that the long drill stem is handled with maximum speed and thereby gain time in drilling operations.

In the accompanying drawing,

Fig. I. plan of drilling set.

Fig. II. sectional view of planetary sets.

Fig. III. sectional view of change gears.

In the description, the parts are referred to in the drawing by numerals.

In Fig. I. the vertical drill stem (1), is shown by square section, is held within the rotary table (2). A bevel pinion (3) is keyed on drive shaft (4) and drives into bevel gear teeth on the under side of rotary table (2). This shaft (4) turns in bearings, in base frame (6). Upon shaft (4) is brake band (5), also flexible couplings (7) and (9) and connecting coupling (8). Keyed to end of shaft (4) is bevel gear (10), driven by bevel gear (11), which is keyed on shaft (12) and shaft boxes (14), (15), (16) are retained by a single base plate. Chain sprocket (13) is keyed to shaft (12) and drives to a cat head. Keyed at end of shaft (12) is sun pinion (17) which is a part of the first planetary set. Meshing into teeth of sun pinion (17) are three planet pinions (18), which rotate on pins held by drive disc (19), keyed to shaft (20). Change pinion (21) is keyed to same shaft (20) and turns in proper bearings.

Meshing with the change pinion (21) is change idler gear (22), keyed to idler shaft (23) and revolving in movable bearings so that gear centers may change to suit change gears. Meshing into change idler gear (22) is driven change gear (24), keyed on shaft (25) which turns in bearings and at the other end of shaft (25) is keyed sun pinion (26), which is a part of the second planet gear set. Meshing with this sun pinion (26) are three planet pinions (27), revolving on pins, held by driven disc (28), which is keyed to drum shaft (29). The brake bands (30) and (31) control hoist drum (32), which is connected to drilling tool (1), by rope tackle.

Power is applied to drive shaft (33), through chain sprocket (34), or a pulley, or motor may be used to turn this shaft.

Keyed to drive shaft (33) is drive pinion (35), which meshes into the external teeth of ring gear (36). The internal teeth mesh with planet pinions (18), attached to shaft (20), by drive disc (19), this ring gear (36), meshes also externally with ring gear (37), of the second planet set. Both ring gears (36) and (37) are free on their shafts; but may be locked internally so that they will drive their shafts as solid gears. Meshing with ring gear (37) internally are planet pinions (27), which drive hoist drum shaft (29), through the drive disc (28). The direction of rotation of gear parts is shown in Fig. II and Fig. III. The direction shown is for the ordinary direction of drilling.

When turning power is applied to drive shaft (33), the engaged teeth of the gears (35), (36) and (37) will transmit to planet pinions (18) and (27). While the planet pinions (18) transmit to change gears (21), (22), (24) and (26), the sun gear (17)

transmits to bevel gears (10) and (11) and (3) to rotary table (2) and to drilling tool (1). The friction drum (5) with band safeguards the direction of rotation of table (2), acting as a brake to stop shaft (4) when necessary.

To aid further description, it will be of advantage, to designate and divide the gears into numbered systems, to show how they may act as individual sets. Let the [power set #1 be gears (35), (36), (37).] [Planet pinions (27) and drum (32) with brake bands (31) and (30), is drum set #2.] [Planet pinions (18) and change gears (21), (22), (24) and sun gear (27) is change set #3,] and [the sun gear (17) and bevel gears (11), (10) and (3) is rotary set #4.] With the power set #1, running and driving to rotary set #4, (this is the ordinary drilling operation) the brake bands (30) and (31) in drum set #2, holds to proper working load, the stress for drilling and sustain a part of the weight of drill tool (1), so that the proper load is on drill bit, to enter the surfaced drilled. In this way, just the proper stresses are maintained throughout the planet gear systems. The downward pull of the tool weight will cause the hoisting drum (32) to unwind, this turning effect will increase, as the drilling goes on, due to the undermining effect of drilling bit, and resulting increase weight of drill stem.

The action of drilling and slippage of brake bands, feeds the drill tool to its work. This method is in practice today, in rotary drilling rigs; but in this drilling set, these conditions are aided by the slowly rotating of the drum set #2, in the direction, in which, the drum turns to lower the tool. If while drilling is going on, under the above conditions, the drill should enter a crevice in the rock and cause the rotary set #4 to stop, then automatically, without shock, the stopping of this set #4, will cause the drum set #2, to rotate in the direction, to hoist the tool from the engaged surface. The arrangement of the gear sets also permits of changes, to obtain useful and efficient hoisting speeds. When the two planet sets are locked, so that the ring gears (36) and (37) will drive as solid gears, the power is then transmitted directly to the drum (32). By the many possible combinations of the systems #1, #2, #3, and #4, different speeds of hoisting the drilling stem are obtained.

Therefore, by the arrangements of parts as shown in drawing and here described, a drilling set is obtained, as a means of applying a source of power, through a double planetary set of gears, controlled by brake bands, to useful and automatic service.

Claims.

1. In rotary drilling sets, a rotary table, with means for holding drilling tool, double planetary gear sets connecting said table to transmitting power, brake band means controlling speed and direction of said table and also the raising or lowering of drill tool with change gear set as a means for obtaining various speed relations of double differential gear sets.

2. In rotary drilling sets, double planetary gear sets as means for transmitting turning power to drill tool, or as means for raising or lowering said tool to engagement, with brake band means for controlling the direction of turning and relative motion of gear set parts.

3. In rotary drilling sets, double planetary gear sets as means for applying turning power to drilling tool and means for safe guarding excessive stresses to tool.

4. In rotary drilling machines, double differential gear sets as means for applying turning power and as means for feeding tool to engagement with automatic reverse action to relieve stress.

5. In rotary drilling sets, two planetary gear sets as means for transmitting turning power and means for raising, lowering or holding drill tool while drilling.

6. In rotary drilling sets, a rotary table with means for turning a drilling tool, shaft and double planetary gear set means for transmitting turning power to drill tool, with brake band means for controlling the direction of turning of gear sets, hoist drum, rope tackle and brake band means for raising or lowering the drill tool to engagement, with change gear set means for regulating the differential gear set action and maintaining a set feed action to drill tool.

In testimony whereof, I affix my signature.

GURDON T. POLLARD.